US009521162B1

(12) United States Patent
Zand et al.

(10) Patent No.: US 9,521,162 B1
(45) Date of Patent: Dec. 13, 2016

(54) APPLICATION-LEVEL DDOS DETECTION USING SERVICE PROFILING

(71) Applicant: Narus, Inc., Sunnyvale, CA (US)

(72) Inventors: Ali Zand, Goleta, CA (US); Gaspar Modelo-Howard, Fremont, CA (US); Alok Tongaonkar, San Jose, CA (US); Sung-Ju Lee, Redwood City, CA (US); Christopher Kruegel, Santa Barbara, CA (US); Giovanni Vigna, Santa Barbara, CA (US)

(73) Assignee: Narus, Inc., Sunnyvale, CA (US)

( * ) Notice: Subject to any disclaimer, the term of this patent is extended or adjusted under 35 U.S.C. 154(b) by 0 days.

(21) Appl. No.: 14/550,422

(22) Filed: Nov. 21, 2014

(51) Int. Cl.
*G06F 11/00* (2006.01)
*H04L 29/06* (2006.01)

(52) U.S. Cl.
CPC ......... *H04L 63/1441* (2013.01); *H04L 63/145* (2013.01); *H04L 63/1408* (2013.01); *H04L 63/1416* (2013.01)

(58) Field of Classification Search
CPC .................................................. H04L 63/1441
See application file for complete search history.

(56) References Cited

U.S. PATENT DOCUMENTS

| 9,183,385 | B2 * | 11/2015 | Chapman, II | G06F 21/554 |
| 2006/0037077 | A1 * | 2/2006 | Gadde | H04L 63/168 726/23 |
| 2006/0047807 | A1 * | 3/2006 | Magnaghi | H04L 63/1458 709/224 |
| 2006/0272018 | A1 * | 11/2006 | Fouant | H04L 63/1416 726/23 |
| 2012/0278890 | A1 * | 11/2012 | Maatta | H04L 63/1425 726/23 |
| 2015/0003671 | A1 * | 1/2015 | Saitwal | G06K 9/00711 382/103 |

(Continued)

OTHER PUBLICATIONS

Animesh Patcha & Jung-Min Park, "An overview of anomaly detection techniques: Existing solutions and latest technological trends," Computer Networks, Feb. 16, 2007, pp. 3448-3470.*

(Continued)

*Primary Examiner* — Luu Pham
*Assistant Examiner* — Canh Le
(74) *Attorney, Agent, or Firm* — Kwan & Olynick LLP

(57) ABSTRACT

A method for detecting a malicious network activity. The method includes extracting, based on a pre-determined criterion, a plurality of protection phase feature sequences extracted from a first plurality of network traffic sessions exchanged during a protection phase between a server device and a first plurality of client devices of a network, comparing the plurality of protection phase feature sequences and a plurality of profiling phase feature sequences to generate a comparison result, where the plurality of profiling phase feature sequences were extracted from a second plurality of network traffic sessions exchanged during a profiling phase prior to the protection phase between the server device and a second plurality of client devices of the network, and generating, in response to detecting a statistical measure of the comparison result exceeding a pre-determined threshold, an alert indicating the malicious network activity.

20 Claims, 5 Drawing Sheets

(56) References Cited

U.S. PATENT DOCUMENTS

2015/0082437 A1* 3/2015 Dodson ................ G06F 21/552
726/23

OTHER PUBLICATIONS

R. Saminathan & Dr. K. Selvakumar, "PROFIDES—Profil based Intrusion Detection Approach Using Traffic Behavior over Mobile Ad Hoc Network," International Journal of Computer Applications (0975-8887), vol. 7—No. 14, Oct. 2010, pp. 21-26.*

Rao and G. Kesidis, "Detecting malicious packet dropping using statistically regular traffic patterns in multihop wireless networks that are not bandwidth are not bandwidth limited" GLOBECOM 2003, IEEE, pp. 2957-2961.*

Tysen Leckie et al., "Metadata for Anomaly-Based Security Protocol Attack Deduction," IEEE Transactions on Knowledge and Data Engineering, vol. 16, No. 9, Sep. 2004, pp. 1157-1168.*

* cited by examiner

APPLICATION-LEVEL DDOS DETECTION USING SERVICE PROFILING

BACKGROUND OF THE INVENTION

A denial-of-service (DoS) or distributed denial-of-service (DDoS) attack is a malicious network activity (i.e., activity or attempt to disrupt computer operations) to make a victim (e.g., a machine or network resource) unavailable to its intended users. An attacker sends control packets to the previously-compromised flooding sources, instructing them to target at the victim. The flooding sources then collectively generate and send an excessive number of flooding packets to the victim, but with fake and randomized source addresses, so that the victim cannot locate the flooding sources.

SUMMARY

In general, in one aspect, the present invention relates to a method for detecting a malicious network activity. The method includes extracting, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device, extracting, based on a second pre-determined criterion, a feature sequence from each of the plurality of consecutive segments, wherein the feature sequence comprises a sequence of feature vectors corresponding to and representing the sequence of consecutive packets, including the feature sequence in a plurality of protection phase feature sequences extracted from a first plurality of network traffic sessions exchanged during the protection phase between the server device and a first plurality of client devices of the network, comparing the plurality of protection phase feature sequences and a plurality of profiling phase feature sequences to generate a comparison result, wherein the plurality of profiling phase feature sequences were extracted from a second plurality of network traffic sessions exchanged during a profiling phase prior to the protection phase between the server device and a second plurality of client devices of the network, and generating, in response to detecting a statistical measure of the comparison result exceeding a pre-determined threshold, an alert indicating the malicious network activity.

In general, in one aspect, the present invention relates to a system for detecting a malicious network activity. The system includes a processor and memory, a feature sequence generator comprising instructions stored in the memory, when executed on the processor having functionality to extract, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device, extract, based on a second pre-determined criterion, a feature sequence from each of the plurality of consecutive segments, wherein the feature sequence comprises a sequence of feature vectors corresponding to and representing the sequence of consecutive packets, including the feature sequence in a plurality of protection phase feature sequences extracted from a first plurality of network traffic sessions exchanged during the protection phase between the server device and a first plurality of client devices of the network, and extract a plurality of profiling phase feature sequences that were extracted from a second plurality of network traffic sessions exchanged during a profiling phase prior to the protection phase between the server device and a second plurality of client devices of the network, a malicious activity detector comprising instructions stored in the memory, when executed on the processor having functionality to compare the plurality of protection phase feature sequences and the plurality of profiling phase feature sequences to generate a comparison result, and generate, in response to detecting a statistical measure of the comparison result exceeding a pre-determined threshold, an alert indicating the malicious network activity, and a repository for storing the plurality of profiling phase feature sequences, the plurality of protection phase feature sequences, and the plurality of suspicious feature sequences.

In general, in one aspect, the present invention relates to a non-transitory computer readable medium embodying instructions for detecting a malicious network activity. The instructions when executed by a processor of a computer includes functionality for extracting, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device, extracting, based on a second pre-determined criterion, a feature sequence from each of the plurality of consecutive segments, wherein the feature sequence comprises a sequence of feature vectors corresponding to and representing the sequence of consecutive packets, including the feature sequence in a plurality of protection phase feature sequences extracted from a first plurality of network traffic sessions exchanged during the protection phase between the server device and a first plurality of client devices of the network, comparing the plurality of protection phase feature sequences and a plurality of profiling phase feature sequences to generate a comparison result, wherein the plurality of profiling phase feature sequences were extracted from a second plurality of network traffic sessions exchanged during a profiling phase prior to the protection phase between the server device and a second plurality of client devices of the network, and generating, in response to detecting a statistical measure of the comparison result exceeding a pre-determined threshold, an alert indicating the malicious network activity.

Other aspects and advantages of the invention will be apparent from the following description and the appended claims.

DETAILED DESCRIPTION

Figure 1:
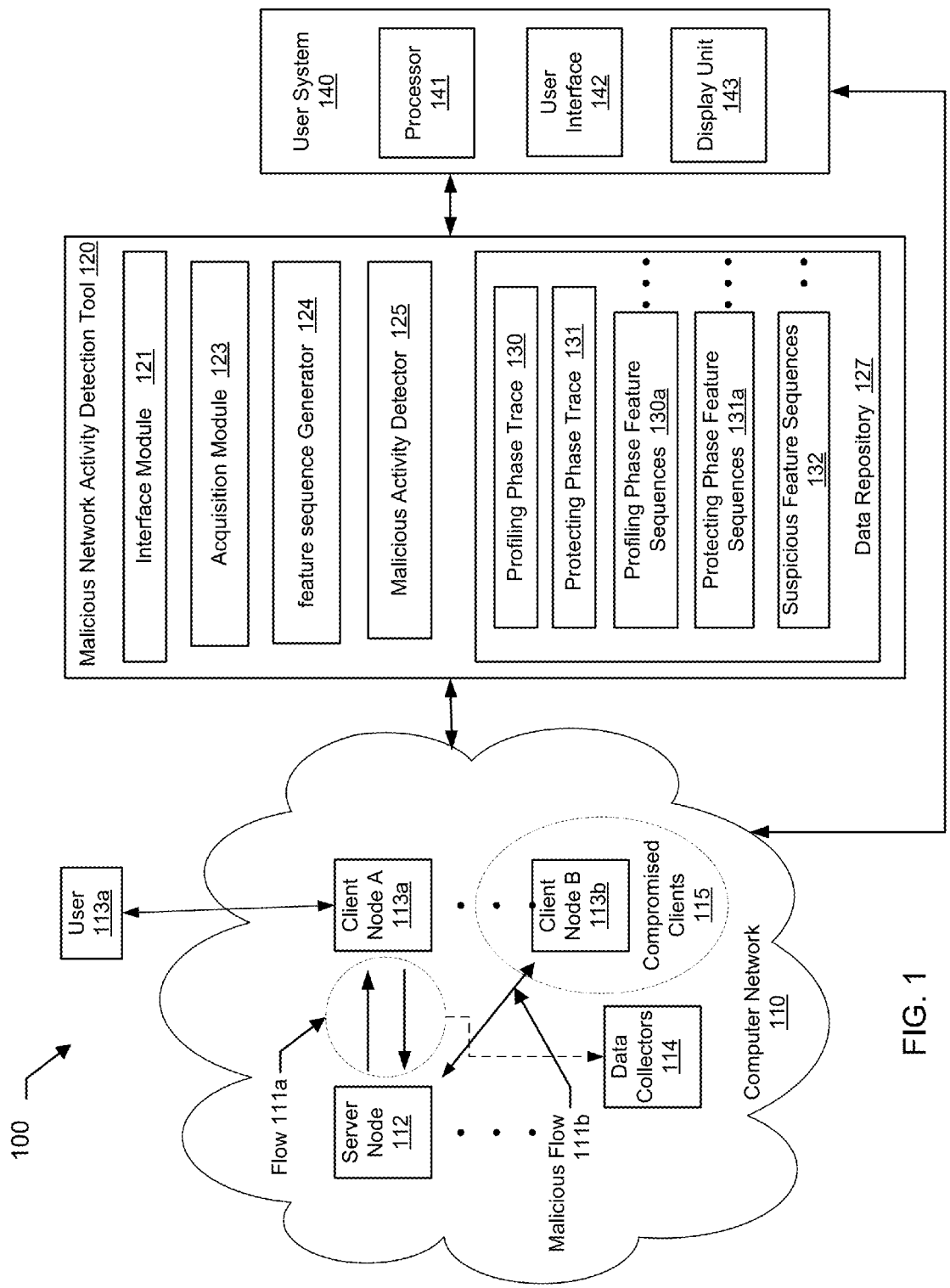
FIG. 1 shows a schematic block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a system, method, and computer readable medium for detecting and protecting against malicious network activities, such as DoS attacks or DDoS attacks launched on servers. In one or more embodiments, the invention is referred to as DDoS Protection Service (DPS). In one or more embodiments, network traffic to the servers under protection is monitored in two phases: profiling phase and protection phase. For the purpose of simplicity, from here on we assume that a DPS protects one and only one service. As used herein, the term "service" refers to an application server that may be accessed remotely, such as a web server, email server, domain name server (DNS), etc.

During the profiling phase, network traffic destined to the protected service is compiled into a set of sessions to the service. The profiling phase is a user defined time period that is confirmed to be free of malicious network activities. Then, the sessions are categorized into different classes that are represented by a set of profiling phase feature sequences. The goal is to detect different classes of traffic that legitimate users of the service generate. In addition, the response time of the service is monitored. When a delay in the response time is detected, the protection phase is initiated to determine if such delay is caused by a DoS or DDoS attack. In other words, the protection phase is the time period subsequent to the initiation and may end based on input of the analyst user, or based on determination that no DoS or DDoS attack is present.

During the protection phase, the session traffic is gathered during the initial stage of an attack and categorized into different classes that are represented by protection phase feature sequences. A subset of the protection phase feature sequences is generated by removing any protection phase feature sequence not found in the set of profiling phase feature sequences. A statistical measure of the subset is then compared against a threshold to determine if any protection phase feature sequence indicates an attack.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. Throughout this disclosure, the term "flow" refers a bi-directional flow unless explicitly stated otherwise.

FIG. 1 shows a diagram of a system (100) in accordance with one or more embodiments. In one or more embodiments of the invention, one or more of the components shown in FIG. 1 may be omitted, repeated, and/or partitioned in a different manner. Accordingly, embodiments of the invention should not be considered limited to the specific arrangements of components shown in FIG. 1.

As shown in FIG. 1, the system (100) includes a malicious network activity detection tool (120), a user system (140), and a computer network (110). The malicious network activity detection tool (120) includes data repository (127), one or more application interfaces (121), an acquisition module (123), a Feature sequence generator (124), an a malicious activity detector (126). The user system (140) includes a processor (141), a user interface (142), and a display unit (143). The computer network (110) may include cellular communications network or other mobile communications network, wired and/or wireless portions of the Internet, wide area networks (WANs), local area networks (LANs), etc.

Further, the computer network (110) includes network nodes (e.g., server node (112), client node A (113a), client node B (113b), data collectors (114), etc.), which are the devices configured with computing and communication capabilities for executing applications in the network (110). As shown in FIG. 1, the server node (112) and client node A (113a) communicate with each other by exchanging data packets forming a flow (111a), which includes two unidirectional flows represented by two arrows. Although shown as a bi-directional flow in the example depicted in FIG. 1, the flow (111a) may also be a single unidirectional flow in other examples. In one or more embodiments, the server node (112) and the client node A (113a) exchange data packets in the flow (111a) as a result of an application executing on the server node (112) and the client node A (113a). In this context, the flow (111a) is referred to as being generated by the application executing on the server node (112) and client node A (113a). In one or more embodiments, the client node A (113a) may be a mobile device, such as a smartphone, a tablet computer, a hand held gaming device, etc., used by a user (113a) (e.g., an individual). In such embodiments, the application may be referred to as a mobile application, mobile app, or app. Generally, multiple server nodes and multiple client nodes are present in the computer network (110). In one or more embodiments, certain client nodes (e.g., client node B (113b), etc. collectively referred to as compromised clients (115)) are compromised and used to launch a malicious network activity, such as a DoS or DDoS attack. For example, the compromised clients (115) may be used to send an excessive number of flooding packets in malicious flows (e.g., malicious flow (111b)) to the server node (112). These malicious flows disrupt normal operations of the server node (112), such as causing excessive delays in the response time for exchanging the flow (111a) with the client node A (113a). In one or more embodiments, certain device(s) (e.g., data collectors (114)) within the computer network (110) may be configured to collect network data (e.g., flow (111a)) for providing to the malicious network activity detection tool (120). Each of these components is described below. One of ordinary skill in the art will appreciate that embodiments are not limited to the configuration shown in FIG. 1.

In one or more embodiments of the invention, the malicious network activity detection tool (120) is configured to interact with the computer network (110) using one or more of the application interface(s) (121). The interface module (121) may be configured to receive data (e.g., flow (111a)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the interface module (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the interface module (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious network activity detection tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the malicious network activity detection tool (120). The analyst user may include, but is not limited to, an individual, a group, an organization, or some other entity having authority and/or responsibility to access the malicious network activity detection tool (120). Specifically, the context of the term "analyst user" here is distinct from that of a user (e.g., user (113a)) of the computer network (110) or a user (e.g., user (113a)) of the application executing on the sever node (112) and the client node A (113a). The user system (140) may be, or may contain a form of, an internet-based communication device that is capable of communicating with the interface module (121) of the malicious network activity detection tool (120). Alternatively, in one or more embodiments, the malicious network activity detection tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious network activity detection tool (120) (e.g., report, alert, etc.), including intermediate and/or final results of the signature set selection process.

As shown, communication links are provided between the malicious network activity detection tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the malicious network activity detection tool (120), the user system (140), and the communication links may be part of the computer network (110).

In one or more embodiments, a central processing unit (CPU, not shown) of the malicious network activity detection tool (120) is configured (e.g., programmed) to execute instructions to operate the components of the malicious network activity detection tool (120). In one or more embodiments, the memory (not shown) of the malicious network activity detection tool (120) is configured to store software instructions for analyzing the network trace to infer user interest. The memory may be one of a variety of memory devices, including but not limited to random access memory (RAM), read-only memory (ROM), cache memory, and flash memory. The memory may be further configured to serve as back-up storage for information stored in the data repository (127).

The malicious network activity detection tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the malicious network activity detection tool (120) is configured to obtain and store data in the data repository (127). In one or more embodiments, the data repository (127) is a persistent storage device (or set of devices) and is configured to receive data from the computer network (110) using the interface module (121). The data repository (127) is also configured to deliver working data to, and receive working data from, the acquisition module (123), feature sequence generator (124), and malicious activity detector (125). The data repository (127) may be a data store (e.g., a database, a file system, one or more data structures configured in a memory, some other medium for storing data, or any suitable combination thereof), which may include information (e.g., profiling phase trace (130), profiling phase feature sequences (130a), protection phase trace (131), protection phase feature sequences, suspicious feature sequences (132), etc.) related to detecting the malicious network activity. The data repository (127) may be a device internal to the malicious network activity detection tool (120). Alternatively, the data repository (127) may be an external storage device operatively connected to the malicious network activity detection tool (120).

In one or more embodiments, the malicious network activity detection tool (120) is configured to interact with the user system (140) using the interface module (121). The interface module (121) may be configured to receive data and/or instruction(s) from the user system (140). The interface module (121) may also be configured to deliver information and/or instruction(s) to the user system (140). In one or more embodiments, the malicious network activity detection tool (120) is configured to support various data formats provided by the user system (140).

In one or more embodiments, the malicious network activity detection tool (120) includes the acquisition module (123) that is configured to obtain a network trace (e.g., profiling phase trace (130), protection phase trace (131), etc.) from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows (e.g., flow (111a)) to form the network trace.

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event. In one or more embodiments, the flows are captured to form the profiling phase feature sequences (130a) during a profiling phase, and captured to form the protection phase trace (131) during a protection phase.

In one or more embodiments of the invention, the malicious network activity detection tool (120) includes the feature sequence generator (124) that is configured to extract profiling phase feature sequences (130a) from the profiling phase trace (130), and protection phase feature sequences (131a) from the protection phase trace (131). In one or more embodiments, the feature sequence generator (124) extracts the profiling phase feature sequences (130a) and the protection phase feature sequences (131a) using the method described in reference to FIG. 2 below. An example of extracting the profiling phase feature sequences (130a) and the protection phase feature sequences (131a) is described in reference to FIG. 3 below.

In one or more embodiments of the invention, the malicious network activity detection tool (120) includes the malicious activity detector (125) that is configured to detect the DoS or DDoS attack by comparing the profiling phase feature sequences (130a) and the protection phase feature sequences (131a). In one or more embodiments, the malicious activity detector (125) detects the DoS or DDoS attack using the method described in reference to FIG. 2 below. An example of detecting the DoS or DDoS attack is described in reference to FIG. 3 below.

Figure 2:
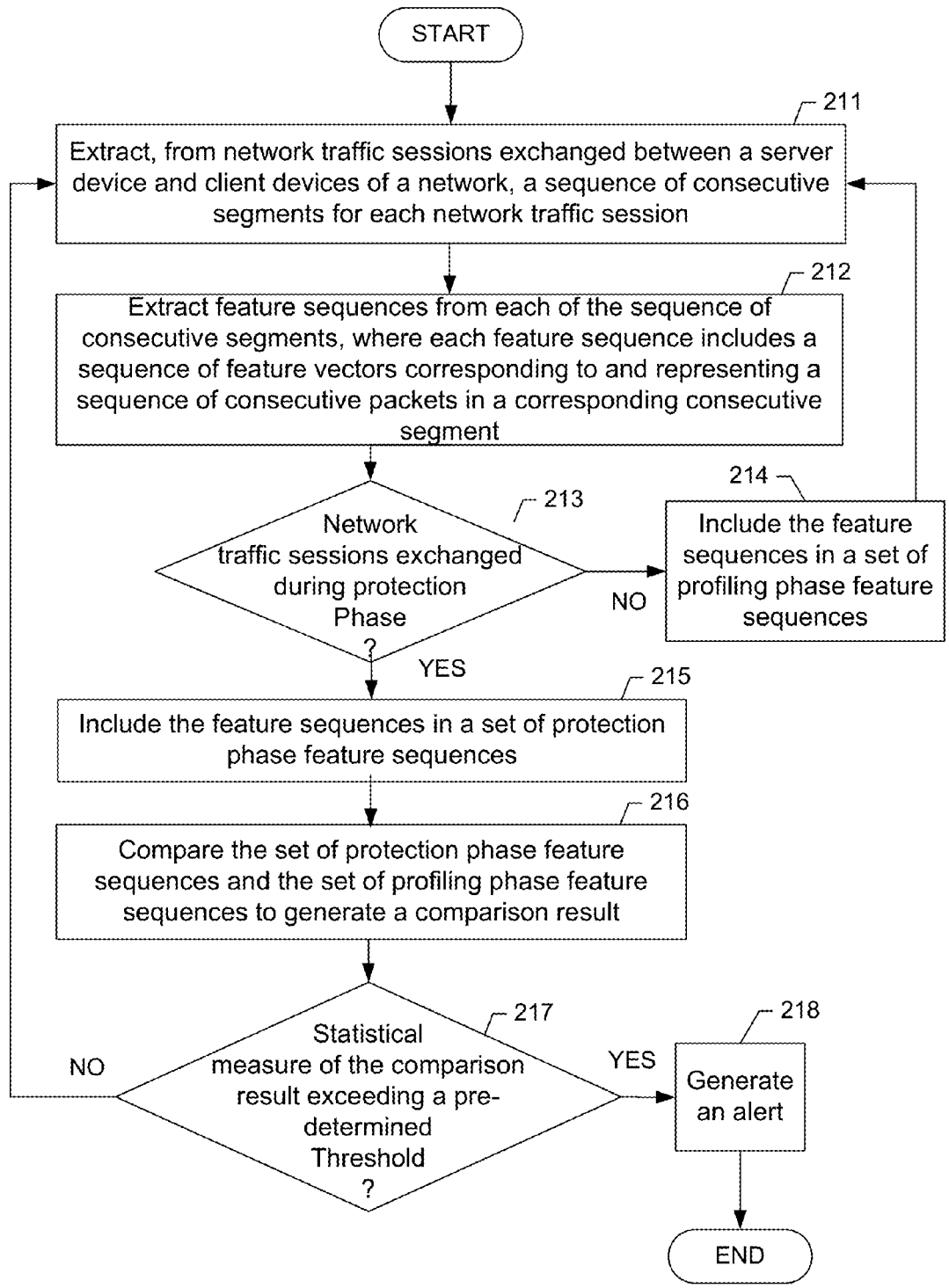
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using the system (100) and the user device (160) described with respect to FIGS. 1A and 1C above.

Initially in Step 211, a sequence of consecutive segments is extracted from a network traffic session exchanged between a server device and any client device of a network. In one or more embodiments, each consecutive segment includes a sequence of consecutive packets exchanged between the server device and the client device. In one or more embodiments, the sequence of consecutive segments is extracted based on a first pre-determined criterion. For example, each consecutive segment may have the same number of packets specified by the first pre-determined criterion. In other words, the network traffic session is divided into equal size segments, e.g., starting from the leading packet in the network traffic session until the remaining packet is less than the size of one segment.

In Step 212, a feature sequence is extracted from each consecutive segment to represent the sequence of consecutive packets in the segment. In one or more embodiments, the feature sequence includes a sequence of feature vectors extracted from the sequence of consecutive packets. For example, each feature vector corresponds to a packet and includes a packet direction, a packet payload length of a server transmitted packet, a packet payload length range of a client transmitted packet, packet flags, and a packet inter-arrival time that are extracted from the packet.

An example of extracting the consecutive segments of the network traffic session and extracting the feature sequences from the segments are described in reference to FIG. 3 below.

In Step 213, a determination is made as to whether the network traffic session from which the feature sequences were extracted is exchanged during the protection. If the determination is positive, i.e., the protection phase has been initiated when the network traffic session is exchanged by the server device and the client device, the method proceeds to Step 215. In one or more embodiments, the protection phase is initiated in response to detecting that the response time to executing an application on the server has exceeded a pre-determined limit. Otherwise, if the determination is negative, i.e., the protection phase has not been initiated, the method proceeds to Step 214. In other words, the method remains in the profiling phase.

In Step 214, the feature sequences extracted in the Steps 211 and 212 during the profiling phase are included in a set of profiling phase feature sequences. In one or more embodiments, the same feature sequence may be found multiple times in the network traffic session. In such embodiments, multiple copies of the same feature sequence may all be included the set of profiling phase feature sequences. Alternatively, the same feature sequence extracted multiple times from the network traffic session is included once in the set of profiling phase feature sequences and assigned a count of how many times the feature sequence was extracted. In one or more embodiments, the set of profiling phase feature sequences is used as a baseline against which a set of protection phase feature sequences is compared. Once the feature sequences are included in the set of profiling phase feature sequences, the method returns to Step 211 to continue monitoring the network traffic sessions during the profiling phase and updating the set of profiling phase feature sequences.

In Step 215, the feature sequences extracted in the Steps 211 and 212 during the protection phase are included in a set of protection phase feature sequences. In one or more embodiments, the same feature sequence may be found multiple times in the network traffic session. In such embodiments, multiple copies of the same feature sequence may all be included the set of protection phase feature sequences. Alternatively, the same feature sequence extracted multiple times from the network traffic session is included once in the set of protection phase feature sequences and assigned a count of how many times the feature sequence was extracted.

In Step 216, the set of protection phase feature sequences and the set of profiling phase feature sequences are compared to generate a comparison result. In one or more embodiments, the comparison result includes a set of suspicious feature sequences that is extracted from the set of protection phase feature sequences by excluding any feature sequence not found during the profiling phase. In other words, any feature sequence not found in the set of profiling phase feature sequences is excluded from the set of protection phase feature sequences to generate the set of suspicious feature sequences.

In Step 217, a determination is made as to whether a statistical measure of the comparison result exceeds a pre-determined threshold. If the determination is positive, i.e., the statistical measure of the comparison result exceeds the pre-determined threshold, the method proceeds to Step 218 where an alert is generated indicating the malicious network activity, such as the DoS or DDoS attck. Otherwise, if the determination is negative, i.e., the statistical measure of the comparison result does not exceed the pre-determined threshold, the method returns to Step 211 to continue monitoring the network traffic sessions during the protection phase and updating the set of protection phase feature sequences.

In one or more embodiments, the statistical measure includes a difference between a first number of occurrences of a particular feature sequence among the set of protection phase feature sequences and a second number of occurrences of the particular feature sequence among the set of profiling phase feature sequences. In one or more embodiments, the alert identifies the particular feature sequence whose statistical measure exceeded the pre-determined threshold and triggered the alert.

In one or more embodiments, the statistical measure includes one or more of a tally of different feature sequences among the set of suspicious feature sequences and/or a number of occurrence of a particular feature sequence among the set of suspicious feature sequences. In particular, the tally of different feature sequences represents a count of how many different feature sequences are found in the set of suspicious feature sequences. Similarly, the number of occurrence of a particular feature sequence represents how many times the particular feature sequence has been included into the set of suspicious feature sequences.

In one or more embodiments, the statistical measure represents a rate of change of (i) the tally of different feature sequences among the set of suspicious feature sequences and/or (ii) the number of occurrence of a particular feature sequence among the set of suspicious feature sequences. For example, the set of suspicious feature sequences may be divided into a first subset of suspicious feature sequences corresponding to a particular time period during the protection phase, and a second subset of suspicious feature sequences corresponding to a subsequent time period during the protection phase. Accordingly, the statistical measure is computed based on the increase of (i) and/or (ii) from the particular time period to the subsequent time period. The alert is generated if the increased tally and/or number of occurrences exceed a pre-determined threshold.

Figure 3A:
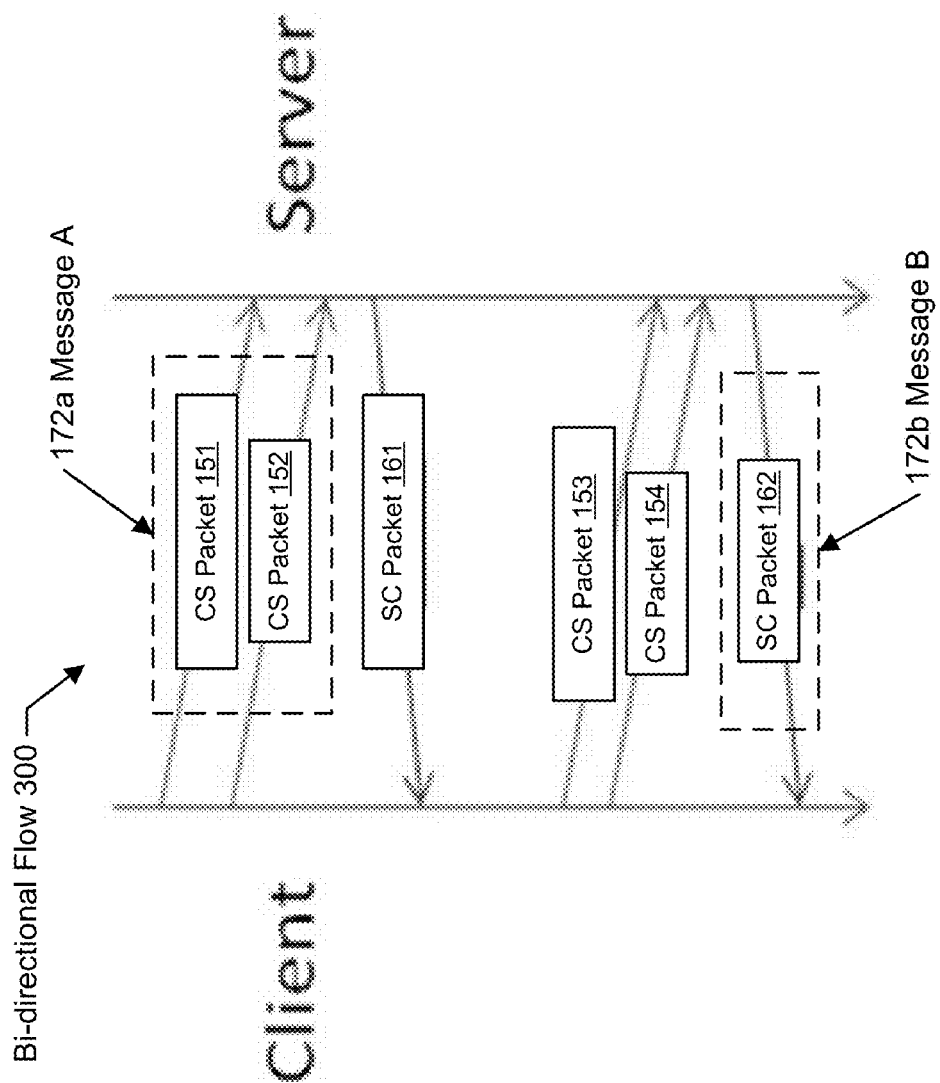
FIGS. 3A and 3B show an example according to aspects of the invention.
Figure 3B:
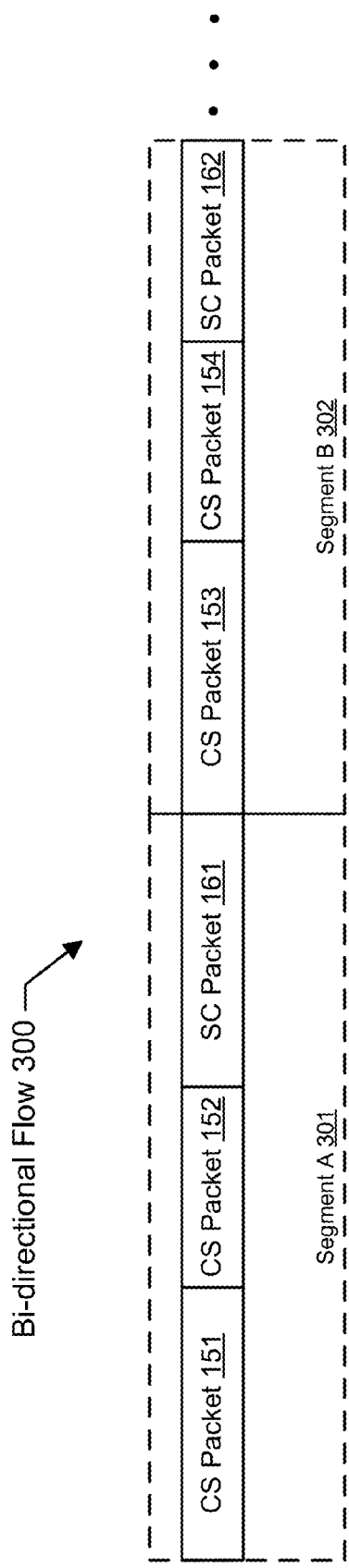

FIGS. 3A and 3B show an example according to aspects of the invention. Specifically, FIG. 3A shows an example of a bi-directional flow (300), which may correspond to the flow (111a) or malicious flow (111b) depicted in FIG. 1 above. As an example of the flow (111a), the bi-directional flow (300) includes a series of messages exchanged between the server node (112) and the client node A (113a) shown in FIG. 1. As an example of the malicious flow (111b), the bi-directional flow (300) includes a series of messages exchanged between the server node (112) and the client node B (113b) shown in FIG. 1. As shown, the vertical downward pointing arrows represent progression of time, along which data packets are exchanged between the client and the server. In particular, data packets sent from the client to the server (C-S) are labeled "CS packet" while data packets sent from the server to the client (S-C) are labeled "SC packet". Accordingly, the series of data communication exchanges between the server and the client includes CS packet (151), CS packet (152), SC packet (161), CS packet (153), CS packet (154), SC packet (162), etc. In one or more embodiments, the series of data communication are layer-seven (i.e., application layer) communications generated by the network application, which is a layer-seven application. In one or more embodiments, the uni-directional packets in-between direction changes form a uni-directional message. For example, CS packet (151) and CS packet (152) form a CS message (i.e., message A (172a)), SC packet (162) forms a SC message (i.e., message B (172b)), etc. In one or more embodiments, the message A (172a) and message B (172b) are application level messages, also referred to as application messages or layer seven messages, while the various packets included therein are layer four packets.

FIG. 3A shows an example of dividing the bi-directional flow (300) into a sequence of consecutive segments, such as the segment A (301), segment B (302), etc. As described above, during the profiling phase, the malicious network activity detection tool monitors the normal traffic sent or received by the protected server, collecting a set of flows that will be used to profile the server. Each flow is represented as an ordered array of feature vectors. Each feature vector in the array corresponds to a packet in the given flow and holds the following properties listed in TABLE 1 below.

TABLE 1

Direction: to capture the origin of the flow, from client or from server
Size: Length in bytes of the packet associated to the flow
Flags: An integer value representing the 8-bits long field in a TCP packet header
Time: Inter-arrival time from the last packet received (expressed in tenths of a second)

If the packet is sent by the server, the actual size of the packet is used. But when a packet is sent by a client, the size property is presented using pre-defined ranges of values. From time to time, packets from a client may be part of an attack, which may exhibit variations in the size of the packet. As an example, two packets, one of length 60 bytes and the other 75 bytes. Using a size range of 55 to 75 bytes, the sizes of a 60-byte packet and a 75-byte packet are both 65 bytes (i.e., the mean value of the range 60 bytes and the other 75 bytes).

Pre-defined ranges of values are also used to represent the inter-arrival time property of the packet. In one or more embodiments, the ranges follow an exponential growth pattern as a range is double the size of its previous range $r_i$. For example, packets showing an inter-arrival time between 0.1 and 0.2 sec belong to one range, while packets with inter-arrival time between 0.21 and 0.4 sec belong to the next range. In the analysis of the DDoS attack network traces, these ranges are observed to be more resilient to the common time variations observed in network traffic and to capture the behavior of attacks.

In one or more embodiments, the locality-preserving hash function shown in TABLE 2 below is applied to each flow to represent each flow as a sequence of feature vectors.

TABLE 2

```
procedure HASHGENERATION(flow)
    hash ← " "
    for packet ∈ flow do
        if packet.direction == "client to server" then
            hash.append("s-")
        else
            hash.append("c-")
        hash.append(packet.payLoadLen)
        hash.append("-")
        hash.append(packet.time)
        hash.append("-")
        hash.append(packet.flags)
        hash.append("|")
    return hash
```

In the locality-preserving hash function shown in TABLE 2 above, the sequence of feature vectors is referred to as the hash, which is a string that contains the direction, size, inter-arrival time, and (decimal representation of the) TCP flags in each packet of the flow. Packet.time represents the inter-arrival time between the packet being hashed and the previous packet received from the same flow. For the first packet in the flow, the packet.time value is 0.

Using the locality-preserving hash function shown in TABLE 2 above and example values of packet.payloadlen, packet.time, and packet.flags, the bi-directional flow (300) depicted in FIG. 3B is converted into the hash below:

c-60-0-2|c-62-0.1-18|s-60-0-16|c-61-0.2-20|c-62-0.1-10|s-60-0.3-19| . . . .

This hash is a concatenation of feature vectors [c-60-0-2], [c-62-0.1-18], [s-60-0-16], [c-61-0.2-20], [c-62-0.1-10], [s-60-0.3-19] . . . , where "-" is used as the de-limiter to separate vector elements in each feature vector. In particular, the six feature vectors [c-60-0-2], [c-62-0.1-18], [s-60-0-16], [c-61-0.2-20], [c-62-0.1-10], and [s-60-0.3-19] correspond to and represent the six packets CS packet (151), CS packet (152), SC packet (161), CS packet (153), CS packet (154), and SC packet (162) shown in FIGS. 3A and 3B above.

In one or more embodiments, the locality-preserving hash function depicted in TABLE 2 above is configurable in the elements of the feature vector. Any of the parameters (size, flags, direction, and time) may be enabled and disabled independently.

As mentioned before, in one or more embodiments, both the time and length parameters are represented according to pre-defined ranges, instead of the actual values observed in each packet. To calculate the size of the ranges for the length parameter, the following formula is used:

$$\text{length}_{range} = \left\lfloor \frac{\text{length}}{\text{LENGTH}_{RANGE_{SIZE}}} \right\rfloor$$

In one or more embodiments, length ranges are only used for packets that are sent from the client to the server. The reasons for treating packets from clients differently from the ones sent by servers are two-fold: (1) to capture the fact that many, different types of clients may potentially connect to a server, each generating packets of different sizes and; (2) DDoS attacks originate from clients, not from the servers being monitored. As such, DPS also accounts for the cases when clients send packets of different sizes to avoid possible detection. In one or more embodiments, for packets sent from server to a client, their corresponding hashes contain the actual lengths of those packets.

The formula used to calculate the size of the ranges for the time parameter, is presented here:

$$\text{time}_{range} = \left\lfloor \log_2 \left( \frac{\text{time}}{\text{TIME}_{RANGE_{SIZE}}} \middle| 1 \right) \right\rfloor$$

There are two differences when using the time ranges to characterize the packets, compared to the previously presented length ranges. First, the time ranges are applied to packets in both directions, coming from clients or servers. Second, the time ranges follow an exponential growth pattern, as one time range is double the size of the previous range. The reason for this exponential split of time ranges is that it is useful to detect and distinguish burst from idle periods, as it is observed in network traffic.

In one or more embodiments, the hash of each flow is divided into equal sized consecutive segments. For example, each consecutive segment may correspond to 3 feature vectors (i.e., 3 packets). In another example, each consecutive segment may correspond to 5 feature vectors (i.e., 5 packets). The sequence of consecutive feature vectors in each equally sized consecutive segment is referred to as a feature sequence. In one or more embodiments, the equal sized consecutive segments of all flows analyzed during a time period are aggregated into a set that is represented by a corresponding set of feature sequences. The set of feature sequences aggregated during the profiling phase is referred to as the set of profiling phase feature sequences.

While aggregating the profiling phase feature sequences, the count of the number of times each feature sequence is found is maintained in a data table "FeatureSequenceTable", as presented in the algorithm below:

TABLE 2

```
procedure CLUSTER_FLOWS(flows)
    Count ← FeatureSequenceTable
    for flow ∈ flows do
        hash = HASHCREATION(flow)
        Count[FeatureSequence] ← Count[FeatureSequence] + 1
```

In one or more embodiments, repetitive feature vector patterns are detected in the hash of a single flow and/or detected across multiple hashes of multiple flows. A repetitive feature vector pattern is a sequence of consecutive feature vectors that repeats more than twice in the hash of a single flow and/or across multiple hashes of multiple flows. In one or more embodiments, each repetitive feature vector pattern is considered as a special case of a feature sequence (i.e., special feature sequence) and included in the set of profiling phase feature sequences. In one or more embodiments, repetitive feature vector patterns are identified as feature sequences before remaining portion of the hash is divided into the equal-sized segments. In this manner, the special feature sequences do not overlap other feature sequences corresponding to the equal-sized segments.

For example, in the hash sequence s-1-0-2|s-1-0-2|c-74-0-18|s-1-0-2|c-74-0-18|s-1-0-16|s-1-0-2|c-74-0-18|s-1-0-16|s-1-3-24|s-1-0-2|c-74-0-18|s-1-0-16|s-1-3-24|c-66-0-16|, the portion s-1-0-2|c-74-0-18|s-1-0-2|c-74-0-18| contains two occurrences of the repetitive feature vector pattern s-1-0-2|c-74-0-18|. The two occurrences of the repetitive feature vector pattern s-1-0-2|c-74-0-18| may be represented by s-1-0-2|c-74-0-18R1| as shown in TABLE 3 below, where Rn stands for repetition between $2^n$ and $2^{n+1}$ times.

TABLE 3

| Before | s-1-0-2\|s-1-0-2\|c-74-0-18\|s-1-0-2\|c-74-0-18\|s-1-0-16\|s-1-0-2\|c-74-0-18\|s-1-0-16\|s-1-3-24\|s-1-0-2\|c-74-0-18\|s-1-0-16\|s-1-3-24\|c-66-0-16\| |
|---|---|
| After | s-1-0-2\|s-1-0-2\|c-74-0-18R1\|s-1-0-16\|s-1-0-2\|c-74-0-18\|s-1-0-16\|s-1-3-24\|s-1-0-2\|c-74-0-18\|s-1-0-16\|s-1-3-24\|c-66-0-16\| |

As described above, the output of the profiling phase serves as a characterization of the types and frequency of the different applications (for example, a web browser, mobile app, or automated client) is connecting to the server. It is observed that the application-level attack traffic appear different from the legitimate applications in the traffic during the profiling phase. However, learning the normal user behavior and mark everything else as an attack, as in prior anomaly detection systems, leads to high false positives and renders the scheme not applicable. Instead, the set of protection phase feature sequences is compared to the set of profiling phase feature sequences when an attack in underway.

The malicious network activity detection tool continuously observes the response time of the service to detect whether a DDoS attack might have started. The protection phase kicks in when a signal indicates that the server performance has been adversely affected, suggesting that a DDoS attack has been launched on the server. The signal may be provided by a monitoring system checking for health points such as server response time, network latency, and CPU load level.

When a delay is detected, the malicious network activity detection tool switches to the protection phase and starts investigating if such delay is a symptom of a DDoS attack. At this moment, the malicious network activity detection tool collects all the flows experienced by the server, for a pre-determined period of time. The flows are then transformed into the hash representation, following the same procedures in the profiling phase.

In the final step of the protection phase, a comparison is made between the set of profiling phase feature sequences and the set of protection phase feature sequences. In particular, the change in the occurrence count of any particular feature sequence (e.g., maintained by the FeatureSequenceTable depicted in TABLE 2 above) between both phases is used to determine if the feature sequence is associated to a DDoS attack. As presented in algorithm DETECT_DDOS in TABLE 4 below, the change in count (i.e., Count[FS]) of a particular feature sequence FS is normalized with respect to the count (i.e., ProfileCount[FS]) of the same feature sequence observed in the profiling phase to allow for usage of a relative threshold value (e.g., 1, 3, 10, 30, etc.). This value represents the number of times the count of the feature sequence grew from what was observed during the profiling phase.

TABLE 4

```
procedure DETECT_DDOS(flows, ProfileCount)
    Count ← FeatureSequenceTable
    for flow ∈ flows do
        hush = HASHCREATION(flow)
        Count[featureSequence] ← Count[FeatureSequence] + 1
```

TABLE 4-continued

```
    for FeatureSequence ∈ Count do
        if |Count[FS]-ProfileCount[FS]|/|ProfileCount[FS]| > Threshold
            then return DDoS
            else return Benign
```

As an example, the profiling phase feature sequence may be generated from a 1-week traffic dataset for a network of approximately 20,000 computers and found over 110 web servers with at least 100,000 flows.

Figure 4:
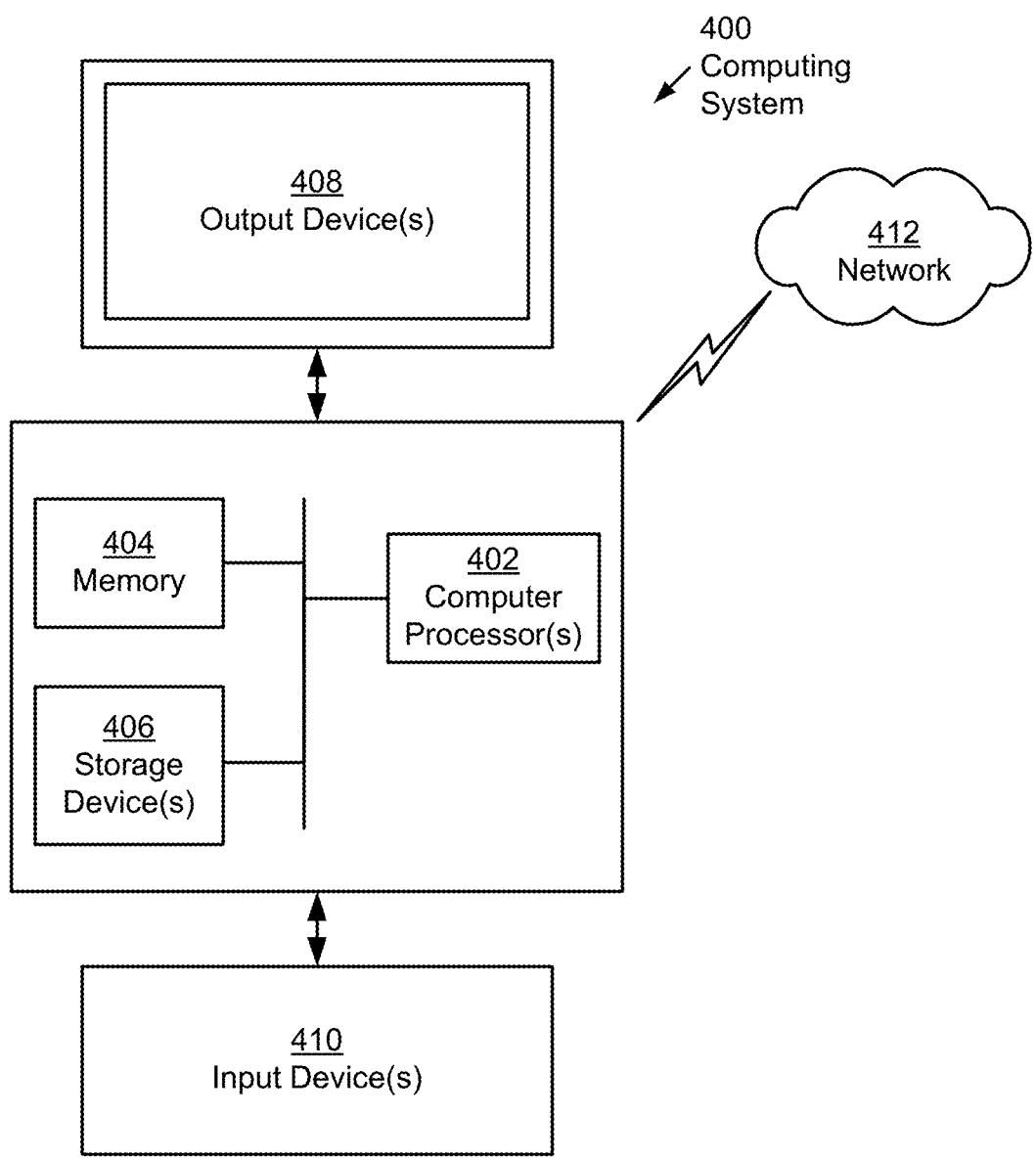
FIG. 4 shows a computing system according to aspects of the invention.

Embodiments of the invention may be implemented on a computing system. Any combination of mobile, desktop, server, embedded, or other types of hardware may be used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor (s) (402) may be an integrated circuit for processing instructions. For example, the computer processor(s) may be one or more cores, or micro-cores of a processor.

The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface flow (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments may be implemented on a distributed system having a plurality of nodes, where each portion of the invention may be located on a different node within the distributed system. In one embodiment of the invention, the node corresponds to a distinct computing device. The node may correspond to a computer processor with associated physical memory. The node may correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for detecting a malicious network activity, comprising:
    extracting, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device;
    extracting, based on a second pre-determined criterion, a feature sequence from each of the plurality of consecutive segments, wherein the feature sequence comprises a sequence of feature vectors corresponding to and representing the sequence of consecutive packets, each feature vector corresponding to a packet in the sequence of consecutive packets and including: a packet direction, a packet payload length of a server transmitted packet, a packet payload length range of a client transmitted packet, packet flags, and a packet inter-arrival time;
    including the feature sequence in a plurality of protection phase feature sequences extracted from a first plurality of network traffic sessions exchanged during the protection phase between the server device and a first plurality of client devices of the network, wherein the plurality of protection phase feature sequences are extracted from the plurality of network traffic sessions based on the first pre-determined criterion and the second pre-determined criterion;
    comparing the plurality of protection phase feature sequences and a plurality of profiling phase feature sequences to generate a comparison result, wherein the plurality of profiling phase feature sequences were extracted from a second plurality of network traffic sessions exchanged during a profiling phase prior to the protection phase between the server device and a second plurality of client devices of the network, wherein generating a comparison result includes extracting, from the plurality of protection phase feature sequences, a set of suspicious feature sequences by excluding any feature sequence not found in the plurality of profiling phase feature sequences; and
    generating, in response to detecting a statistical measure of the comparison result exceeding a pre-determined threshold, an alert indicating the malicious network activity.

2. The method of claim 1,
    wherein the plurality of consecutive segments are extracted from the network traffic session based on the first pre-determined criterion,
    wherein the feature sequence is extracted from each of the plurality of consecutive segments based on the second pre-determined criterion.

3. The method of claim 2,
    wherein the first pre-determined criterion comprises a first specification of a number of packets included in each of the plurality of consecutive segments, and
    wherein the second pre-determined criterion comprises a second specification of a plurality of attributes extracted from each of the plurality of consecutive packets to form a corresponding feature vector.

4. The method of claim 3,
    wherein the plurality of attributes represent at least one selected from a group consisting of a packet direction, a packet payload length of a server transmitted packet, a packet payload length range of a client transmitted packet, packet flags, and a packet inter-arrival time.

5. The method of claim 1,
    wherein the statistical measure comprises a difference between a first number of occurrence of a particular feature sequence among the plurality of protection phase feature sequences and a second number of occurrence of the particular feature sequence among the plurality of profiling phase feature sequences.

6. The method of claim 5,
    wherein the alert identifies the particular feature sequence.

7. The method of claim 1,
    wherein the malicious network activity is known to be absent during the profiling phase.

8. A system for detecting a malicious network activity, comprising:
    a processor and memory;
    a feature sequence generator comprising instructions stored in the memory, when executed on the processor having functionality to:
        extract, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device;
        extract, based on a second pre-determined criterion, a feature sequence from each of the plurality of consecutive segments, wherein the feature sequence comprises a sequence of feature vectors corresponding to and representing the sequence of consecutive packets, each feature vector corresponding to a packet in the sequence of consecutive packets and including: a packet direction, a packet payload length of a server transmitted packet, a packet payload length range of a client transmitted packet, packet flags, and a packet inter-arrival time;
        including the feature sequence in a plurality of protection phase feature sequences extracted from a first plurality of network traffic sessions exchanged during the protection phase between the server device and a first plurality of client devices of the network, wherein the plurality of protection phase feature sequences are extracted from the plurality of network traffic sessions based on the first pre-determined criterion and the second pre-determined criterion; and
        extract a plurality of profiling phase feature sequences that were extracted from a second plurality of network traffic sessions exchanged during a profiling phase prior to the protection phase between the server device and a second plurality of client devices of the network;

a malicious activity detector comprising instructions stored in the memory, when executed on the processor having functionality to:

compare the plurality of protection phase feature sequences and the plurality of profiling phase feature sequences to generate a comparison result wherein generating a comparison result includes extracting, from the plurality of protection phase feature sequences, a set of suspicious feature sequences by excluding any feature sequence not found in the plurality of profiling phase feature sequences; and generate, in response to detecting a statistical measure of the comparison result exceeding a pre-determined threshold, an alert indicating the malicious network activity; and a repository for storing the plurality of profiling phase feature sequences, the plurality of protection phase feature sequences, and the plurality of suspicious feature sequences.

9. The system of claim 8, wherein the plurality of consecutive segments are extracted from the network traffic session based on the first pre-determined criterion, wherein the feature sequence is extracted from each of the plurality of consecutive segments based on the second pre-determined criterion.

10. The system of claim 9, wherein the first pre-determined criterion comprises a first specification of a number of packets included in each of the plurality of consecutive segments, and wherein the second pre-determined criterion comprises a second specification of a plurality of attributes extracted from each of the plurality of consecutive packets to form a corresponding feature vector.

11. The system of claim 10, wherein the plurality of attributes represent at least one selected from a group consisting of a packet direction, a packet payload length of a server transmitted packet, a packet payload length range of a client transmitted packet, packet flags, and a packet inter-arrival time.

12. The system of claim 8, wherein the statistical measure comprises a difference between a first number of occurrence of a particular feature sequence among the plurality of protection phase feature sequences and a second number of occurrence of the particular feature sequence among the plurality of profiling phase feature sequences.

13. The system of claim 12, wherein the alert identifies the particular feature sequence.

14. The system of claim 8, wherein the malicious network activity is known to be absent during the profiling phase.

15. A non-transitory computer readable medium embodying instructions for detecting a malicious network activity, the instructions when executed by a processor of a computer, comprising functionality for:

extracting, based on a first pre-determined criterion and from a network traffic session exchanged during a protection phase between a server device and a client device of a network, a plurality of consecutive segments, wherein each of the plurality of consecutive segments comprises a sequence of consecutive packets exchanged between the server device and the client device;

extracting, based on a second pre-determined criterion, a feature sequence from each of the plurality of consecutive segments, wherein the feature sequence comprises a sequence of feature vectors corresponding to and representing the sequence of consecutive packets, each feature vector corresponding-to-a packet in the sequence of consecutive packets and including: a packet direction, a packet payload length of a server transmitted packet, a packet payload length range of a client transmitted packet, packet flags, and a packet inter-arrival time;

including the feature sequence in a plurality of protection phase feature sequences extracted from a first plurality of network traffic sessions exchanged during the protection phase between the server device and a first plurality of client devices of the network, wherein the plurality of protection phase feature sequences are extracted from the plurality of network traffic sessions based on the first pre-determined criterion and the second pre-determined criterion;

comparing the plurality of protection phase feature sequences and a plurality of profiling phase feature sequences to generate a comparison result, wherein the plurality of profiling phase feature sequences were extracted from a second plurality of network traffic sessions exchanged during a profiling phase prior to the protection phase between the server device and a second plurality of client devices of the network, wherein generating a comparison result includes extracting, from the plurality of protection phase feature sequences, a set of suspicious feature sequences by excluding any feature sequence not found in the plurality of profiling phase feature sequences; and generating, in response to detecting a statistical measure of the comparison result exceeding a pre-determined threshold, an alert indicating the malicious network activity.

16. The non-transitory computer readable medium of claim 15, wherein the plurality of consecutive segments are extracted from the network traffic session based on the first pre-determined criterion, wherein the feature sequence is extracted from each of the plurality of consecutive segments based on the second pre-determined criterion.

17. The non-transitory computer readable medium of claim 16, wherein the first pre-determined criterion comprises a first specification of a number of packets included in each of the plurality of consecutive segments, and wherein the second pre-determined criterion comprises a second specification of a plurality of attributes extracted from each of the plurality of consecutive packets to form a corresponding feature vector.

18. The non-transitory computer readable medium of claim 17, wherein the plurality of attributes represent at least one selected from a group consisting of a packet direction, a packet payload length of a server transmitted packet, a packet payload length range of a client transmitted packet, packet flags, and a packet inter-arrival time.

19. The non-transitory computer readable medium of claim 15, wherein the statistical measure comprises a difference between a first number of occurrence of a particular feature sequence among the plurality of protection phase feature sequences and a second number of occurrence of the particular feature sequence among the plurality of profiling phase feature sequences.

20. The non-transitory computer readable medium of claim 19, wherein the alert identifies the particular feature sequence.

\* \* \* \* \*